(12) United States Patent
Yamakaji

(10) Patent No.: US 7,309,124 B2
(45) Date of Patent: Dec. 18, 2007

(54) METHOD FOR INDICATING OPTICAL PERFORMANCE OF SPECTACLE LENS

(75) Inventor: Tetsuma Yamakaji, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/483,488

(22) PCT Filed: Jul. 15, 2003

(86) PCT No.: PCT/JP03/08961

§ 371 (c)(1),
(2), (4) Date: Feb. 26, 2004

(87) PCT Pub. No.: WO2004/010097

PCT Pub. Date: Jan. 29, 2004

(65) Prior Publication Data

US 2004/0239875 A1    Dec. 2, 2004

(30) Foreign Application Priority Data

Jul. 19, 2002 (JP) .............................. 2002-211641
Jul. 10, 2003 (JP) .............................. 2003-195118

(51) Int. Cl.
*G02C 7/02* (2006.01)
(52) U.S. Cl. ...................................... 351/177
(58) Field of Classification Search ............... 351/177
See application file for complete search history.

(56) References Cited

U.S. PATENT DOCUMENTS

| 3,960,442 | A | 6/1976 | Davis |
| 4,504,128 | A | 3/1985 | Guilino et al. |
| 6,183,084 | B1 * | 2/2001 | Chipman et al. ............ 351/176 |
| 6,222,621 | B1 * | 4/2001 | Taguchi ....................... 356/124 |
| 2002/0196412 | A1 * | 12/2002 | Abitbol ....................... 351/246 |
| 2004/0032565 | A1 * | 2/2004 | Yamakaji et al. ............ 351/177 |

FOREIGN PATENT DOCUMENTS

| JP | A 58-24112 | 2/1983 |
| JP | A 09-182722 | 7/1997 |
| JP | A 2000-186978 | 7/2000 |

* cited by examiner

*Primary Examiner*—Scott J. Sugarman
*Assistant Examiner*—Darryl J. Collins
(74) *Attorney, Agent, or Firm*—Oliff & Berridge, PLC

(57) ABSTRACT

A method for displaying an optical performance preferably applicable to also an axially asymmetric spectacle lens is provided. First, a clear visual region of the spectacle lens is determined using an evaluation function which evaluates the optical performance of the spectacle lens. Next, a clear visual angle which depends on a size of the clear visual region corresponding to a vertex angle of a spherical cone is calculated when the spherical cone which has an equal solid angle with a solid angle including the determined clear visual region from a center of rotation of an eye and which is symmetrical to an optical axis of the spectacle lens is assumed. Next, the calculated clear visual angle is expressed by a unit of degree.

37 Claims, 4 Drawing Sheets

(a)

(b)

(a)

(b)

METHOD FOR INDICATING OPTICAL PERFORMANCE OF SPECTACLE LENS

TECHNICAL FIELD

The present invention relates to a method for displaying optical performances of a spectacle lens, and more particularly to a method for displaying the optical performances suitable for a comparison of an axially asymmetric lens, lenses having different diameters, or the like.

BACKGROUND ART

As a general method for displaying optical performances of a lens, for example, a method described in Patent Document 1 is known. In this method, first, a predetermined sectional direction in a refractive surface of the lens is specified. After this, two evaluation indicators as an astigmatism and a power error (curvature of field) are used as the optical performances in the sectional direction, and are displayed on one longitudinal aberration graph. The longitudinal aberration graph is a graph which displays longitudinal aberration of the lens along a meridian. The method for displaying the optical performances of the lens by the longitudinal aberration graph is preferably used for evaluation of an axially symmetrical lens such as a camera lens or the like, or a spectacle lens.

Patent Document 1: Japanese Patent Laid-open No. Sho 58-24112

However, some spectacle lenses such as a single vision aspherical lens, an astigmatic lens, a progressive-power lens, or the like are not axially symmetrical. When the optical performances of the spectacle lenses which are not axially symmetrical are displayed on the longitudinal aberration graph, only the optical performances in a specified direction along the meridian can be seen. Therefore, the optical performances of an entire axially asymmetric spectacle lens are not fully evaluated. Incidentally, it is also thought that an aberration graph along a direction other than the meridian can be prepared and displayed; however, such an aberration graph is not realistic because it is numerously required and hard to understand.

Furthermore, in the aforementioned display method, when the longitudinal aberration graphs of two different lenses are compared, especially when diameters of these lenses are different, there is a problem that it is difficult to quantitatively compare the optical performances as the entire lenses.

Moreover, in the aforementioned display method, there is a problem that those who do not have technical knowledge of the lens do not instinctively grasp the optical performances of the lens from the longitudinal aberration graphs.

An object of the present invention is to provide a method for displaying optical performances preferably applicable to also the axially asymmetric spectacle lens. Furthermore, an object of the present invention is to appropriately and easily conduct a comparison of the optical performances of the lenses having different design conditions such as the diameter or the like. Furthermore, an object of the present invention is to quantitatively evaluate the optical performances as the entire lens. Furthermore, an object of the present invention is to display the optical performances of the spectacle lens also for those who do not have the technical knowledge to instinctively and easily understand.

DISCLOSURE OF THE INVENTION

The present invention is a method for displaying an optical performance of a spectacle lens, comprises: determining a clear visual region of the spectacle lens; calculating an optical performance value which depends on a size of the clear visual region capable of calculating based on a spherical cone when the spherical cone which has an equal solid angle with a solid angle including the determined clear visual region from a center of rotation of an eye and which is symmetrical to an optical axis of the spectacle lens is assumed; and displaying the optical performance of the spectacle lens using the calculated optical performance value. Respective steps are explained in detail hereinafter.

[Determining Clear Visual Region]

First, the clear visual region of the spectacle lens is determined. The clear visual region is a region of the spectacle lens which can be clearly (clear) seen. This term can be expressed by replacing a different term such as, for example, a distinct visual region or a standard visual region, and not terminologically limited. When determining the clear visual region, indicators such as astigmatism, a power error (mean power error), distortion aberration, a tangential error, a sagittal error, or the like can be used as a reference, however, an evaluation function about visual acuity of the spectacle lens is preferably used. Here, the evaluation function about the visual acuity is a function to calculate optical performance values about the visual acuity in each evaluation point which is set up on the spectacle lens.

Specifically, a range of a converted visual acuity value (to be described later) which defines the clear visual region can be preferably set up within a range of zero to 0.1 or 0.2 expressed by a [logMAR] unit when zero is defined as the clearest. This range is expressed as about 0.6 to about 0.8 by decimal visual acuity. This range is a preferable reference value which can be evaluated as a visual acuity value by a common sense. However, the range of the converted visual acuity value which defines the clear visual region is not specially limited.

As the evaluation function about the visual acuity, there are converted visual acuity to be described later, visual acuity V (refer to claim 4 of Japanese Patent Laid-open No. Sho 58-24112), RMS, or the like. RMS is a spread of points where a group of rays which transmit the spectacle lens so as to make a focus crosses a plane which passes through the focal point and which is perpendicular to an optical axis of the spectacle lens. The respective points can be displayed by a point spread function.

Incidentally, the evaluation function is preferably obtained from design data of the spectacle lens; however, it can be obtained also from data of measured values or the like.

A different aberration according to a distance (for example, respectively near and far) of an object through the spectacle lens is generated in the spectacle lens. Therefore, the evaluation function of the single visual acuity depending on the distance of the object is preferable. Specifically, for example, converted visual acuity is adopted as a single evaluation function about the visual acuity. Here, a calculation of the converted visual acuity is explained hereinafter.

In regards to improvement of the visual acuity, it is important to consider not only the optical performances of the spectacle lens itself but also processing of a retina and a brain. As a paper on the visual acuity and the processing of the retina and the brain, Optmetric Monthly, Nov.: 31-32, 1981: written by Robert N. Kleinstein (hereinafter, referred to as Paper 1) is available. In Paper 1, an experiment of measuring visual acuity of a subject who constantly wears spectacles with his/her spectacles taken off is described. Measurement results are also shown in a view in which a visual acuity measured value is expressed by a fraction visual acuity value, taking spherical diopter (S diopter) and cylindrical diopter (C diopter) in a horizontal axis and a vertical axis respectively. The same view as this view is shown in FIG. 4. Incidentally, the S diopter and the C diopter are used as spectacle terms by those in the art.

In order to use the measured values of Paper 1 as the evaluation function, the measured values are modified in such a manner that the signs of the horizontal axis value S and the vertical axis value C in Paper 1 are reversed, namely, residual S diopter and residual C diopter are taken in the horizontal axis and the vertical axis respectively. Thus, the modified data are equivalent to evaluation data showing how the visual acuity decreases when a subject having normal visual acuity wears spectacles with aberration, reversely to the experiment in Paper 1.

Incidentally, in Paper 1, data of spectacle wearers for the age of 5 to 15, 25 to 35, and 45to 55are described as experimental data, however, it is preferable to use a virtual visual acuity measured value not affected by an adjusting power of the eyes (a unit is diopter). Therefore, the data for the age of 45 to 55 are used from Paper 1 for convenience sake, and improved; thereby the aforementioned evaluation data are obtained.

Here, the residual S diopter and the residual C diopter are correlated to an astigmatism and a curvature of field as described later. If Listing's Law is not taken into consideration, however, the astigmatism and the curvature of field cannot be calculated accurately in regions in which an eyeball does not rotate along two lens principal meridians. Here, the Listing's Law means that there is a rotation axis of an eyeball motion in a plane (Listing's surface) which is perpendicular to an eye position and which includes a center of rotation of an eyeball when the eyeball looks far forward (first eye position).

In other words, on an axis in a lens radiation direction other than the S and C axes of an astigmatic lens, it is necessary to calculate the astigmatism and the curvature of field with the eyeball motion taken into consideration. Therefore, a calculation of a new aberration (the astigmatism and the curvature of field) in which the Listing's Law is taken into consideration is performed in order to use the visual acuity measured value in Paper 1 as an evaluation function on an entire surface of a lens.

Hereinafter, the correlation of the residual S diopter and the residual C diopter with the astigmatism and the curvature of field in which the Listing's Law is taken into consideration will be explained. Taking the Listing's Law into consideration, when the eyeball rotates in a different direction from the principal meridians of the spectacle lens, the angle between the principal meridians and coordinate axes rotating according to the Listing's Law does not become 0 (zero). Accordingly, when an angle deviation described in, for example, Japanese Patent Laid-open No. Sho 57-10112 (hereinafter, referred to as Paper 2) occurs, the following typical problems arise.

In other words, even when a value of the astigmatism is equal with an absolute value of a reference astigmatism (an astigmatic amount and a cylinder axis at the center of a lens), the astigmatism is a vector value having a direction so that a residual astigmatism whose value is not 0 (zero) is newly generated. It should be noted that, as for a calculation of the residual astigmatism, methods for calculating an astigmatic lens and the residual astigmatism of the astigmatic lens as disclosed in Paper 2 or the like are applicable.

Meanwhile, the curvature of field as another factor does not change due to the coordinate change according to the Listing's Law since the curvature of field is a scalar value, not the vector value.

Based on the above, the correlation of the residual astigmatism and the curvature of field with the residual S diopter and the residual C diopter is as follows:

(1) When the residual astigmatism is positive, their correlation is expressed by the following equations (a), (b):

$$\text{residual S diopter} = \text{curvature of field} - \text{residual astigmatism}/2 \quad (a)$$

$$\text{residual C diopter} = \text{residual astigmatism} \quad (b)$$

(2) When the residual astigmatism becomes negative in an optical calculation, their correlation is expressed by the following equations (c), (d) based on an idea similar to diopter conversion of spectacles since the residual C diopter is defined as positive:

$$\text{residual S diopter} = \text{curvature of field} + \text{residual astigmatism}/2 \quad (c)$$

$$\text{residual C diopter} = -\text{residual astigmatism} \quad (d)$$

Next, when seeing FIG. 4, it is first found out that a value of the horizontal axis (residual S diopter) is not symmetrical with respect to the origin. Furthermore, a value of the vertical axis (residual C diopter) has also nonlinear data peculiar to a living human body. For example, when visual acuity values with the same absolute value on the horizontal axis and with different signs are examined, it is clear that a functional relation is not simple. In other words, the visual acuity value is nonlinear relative to the optical performance value. Accordingly, the nonlinear nature peculiar to the living human body needs to be taken into consideration.

Therefore, in the present invention, an interpolation function V is first calculated from the data on the visual acuity measured values in FIG. 4. Specifically, the visual acuity values for horizontal axis values (residual S diopter) and vertical axis values (residual C diopter) are respectively scaled for 0.1 to 1 diopter, and the visual acuity values are discretely plotted. Then, by interpolating the visual acuity values on the plane coordinate using a generally known interpolation method, the interpolation function V including residual S diopter and residual C diopter as variable factors is calculated. The interpolation function V is expressed by the following equation:

$$\text{interpolation function } V = V(\text{residual } S \text{ diopter, residual } C \text{ diopter}) \quad (e)$$

According to the equation (e), the interpolation function V can be calculated even when the residual S diopter and the residual C diopter as the variable factors are a continuous value, not a discrete value.

When calculated results of the equations (a), (b) or the equations (c), (d) are respectively substituted with the residual S diopter and the residual C diopter as the variable factors in the equation (e), the following equation (f) is obtained.

$$\text{interpolation function } V = V(\text{curvature of field, residual astigmatism}) \quad (f)$$

In the equation (f), a right side is obtained by the optical calculation and a left side is the visual acuity value by actual measurement. The optical value and the visual acuity value are thus correlated.

The interpolation function V in the equation (f) can be used as an evaluation function in this state. However, since nonlinearity is high, it is hard to say that it is the best state for an optimization calculation. Therefore, it is further transformed to the following equation (g) expressed by a visual acuity evaluation function (converted visual acuity), which is a definition equation for representing visual acuity. A unit of a value of the converted visual acuity according to the equation (g) is [logMAR].

$$\text{converted visual acuity[logMAR]} = \log_{10}(1/V(\text{curvature of field, residual astigmatism})) \quad (g)$$

Through the above processes, the converted visual acuity in which the nonlinear nature is taken into consideration is derived from the optical performance of the living human body. The visual acuity of the living human body of course changes depending on age, a measurement environment, and so forth. In fact, however, the above-described basic method requires a large calculation amount in the optimization calculation. Therefore, instead of the equation (e), approximate equations such as the following equations (h), (I) can be used:

$$V' = 2^{-X \cdot K} \quad (h)$$

where, K is expressed by the following equation (I):

$$K = [(\text{residual } S \text{ diopter} + \text{residual } C \text{ diopter}/2)^2 + (\text{residual } C \text{ diopter}/2)^2]^{1/2} \quad (I)$$

where, X is a value within a range of 0.5 to 2, and is determined by actual measured data. For example, X=1.442695 according to $\log_{10} e = 1.442695 \times \log_{10} 2$, or the like.

The interpolation function V' in the equation (h) may be used as the evaluation function in this state. The correlation with the converted visual acuity [logMAR] is expressed by the following equation (j), as explained in the aforementioned basic method.

$$\text{converted visual acuity[logMAR]} = X \times \log_{10} 2 \times \{(\text{curvature of field}^2 + (\text{residual astigmatism}/2)^2\}^{1/2} \quad (j)$$

Here, the curvature of field is aberration in an evaluation point of the spectacle lens, and aberration also referred to as a mean power error, a power error, an MOE or the like. The residual astigmatism is an astigmatism considering the Listing's Law.

The evaluation point is plural virtual points which are set up on the spectacle lens in order to evaluate the optical performances of the spectacle lens. When the respective evaluation points are set up, the state in which a ray passes the spectacle lens is assumed and a ray tracing method or the like is used. About 5 to 10 evaluation points on an axially symmetrical lens can be set up and about 15 to 10000 evaluation points can be set up on an axially asymmetric lens. Then, values of the evaluation function (converted visual acuity) in the respective evaluation points are calculated.

The aforementioned equation (j) is an equation in which the optical value and the visual acuity value are correlated. Furthermore, the approximate equation can be transformed by adding measured values by ages in addition to actual visual acuity data or by using another visual acuity measurement data.

It should be noted that an equation of a general regular spherical lens or the like in which Listing's Law is not considered is as follows:

$$\text{converted visual acuity[logMAR]} = X \times \log_{10} 2 \times \{(\text{curvature of field}^2 + (\text{astigmatism}/2)^2\}^{1/2} \quad (k)$$

The astigmatism in the equation (k) represents astigmatism in which the Listing's Law is not considered. The equation (k) can also be used as the converted visual acuity.

If the converted visual acuity according to the equation (j) or the equation (k) is used, an optical value (astigmatism, curvature of field, distortion aberration) of the spectacle lens can be transformed to the converted visual acuity and displayed regardless of a sphere, an aspheric surface, an astigmatic lens, a progressive-power lens.

Furthermore, the following equation can be defined by using the above-explained converted visual acuity.

[Equation 4]

$$\text{merit function} = a \times \sum_n (u_n \cdot \text{far vision log} MAR_n)^2 + \quad (L)$$
$$b \times \sum_n (v_n \cdot \text{near vision log} MAR_n)^2 + c \times \sum_n (w_n \cdot \text{residual } DIST_n)$$

Here, a, b, c are weight distribution of the respective converted visual acuity (evaluation functions); $u_n$, $v_n$, $w_n$ are weight distribution at each evaluation point; and n is an evaluation point. Incidentally, an idea that weight is 0 (zero) is included. However, here, 0 (zero) is not adopted as the weight.

In the equation (L), far vision logMAR is converted visual acuity in the far vision, and near vision logMAR is converted visual acuity in the near vision. Here, the far vision can be arbitrarily and terminologically defined to a certain extent; however, for example, it can be defined as a range from a reference point to 10 [m] or infinity based on a common sense. This range is expressed as 0 (zero) [D] or 0.1 [D] by a diopter unit. Also, the near vision is similarly defined as the far vision, for example, within a range from the reference point to 30 [cm] or 33 [cm]. This range is expressed as approximately 3 [D] or 3.33 [D] by a diopter unit.

There is no uniform standard where the reference point is determined; however, generally, it is any one of a center of rotation of the eye, a lens surface, or a center of a cornea.

Also in the equation (L), residual DIST is the residual astigmatism of the spectacle lens, and calculated by the following equation (m).

$$\text{residual } DIST = \text{Sign} \times 100 \times (|\text{residual visual angle magnification}|/|\text{central visual angle magnification } M_0|) \quad (m)$$

In the equation (m), the residual visual angle magnification is expressed as follows:

residual visual angle magnification=peripheral visual angle magnification $M$–central visual angle magnification $M_0$ where, central visual angle magnification $M0 = \lim_{exit\ angle \to 0}(\tan(\text{exit angle})/\tan(\text{incident angle}))$ peripheral visual angle magnification $M = \tan(\text{exit angle})/\tan(\text{incident angle})$ (refer to KOHGAKU (OPTICS), Vol. 19, No. 10 *"Futatabi Kakubairitsu nitsuite* (On Angle Magnification Again)" written by Kazuo Miyake, et. al.).

Furthermore, the residual DIST is generally a vector and the Sign shows a direction thereof.

According to the aforementioned equation (L), by choosing the weight distribution as an appropriate value, a final vision through the spectacle lens can be expressed more faithfully. Especially, on designing the spectacle lens, a function defined by combining the converted visual acuity (evaluation function) as in the equation (L) is called a merit function. The clear visual region can also be defined by the merit function (evaluation function).

Meanwhile, the values of the converted visual acuity in all evaluation points which are set up on the spectacle lens are calculated using the aforementioned evaluation function (converted visual acuity). Then, the evaluation points where all calculated results thereof are within a predetermined range are specified, and a region including a group of the specified evaluation points is determined as a clear visual region. Incidentally, as the converted visual acuity, the equation (j) in which the Listing's Law is taken into consideration is preferably used.

[Comparison Art]

Here, a display method previously devised by the inventors is explained for comparison with the present invention. A clearly seen region within, for example, the converted visual acuity of 0.1 [logMAR] is defined as the clear visual region, and a ratio of a size of the clear visual region to clear visual region ratio P (%) and expressed by percent using the following equation (n).

$$\text{first clear visual region ratio } P(\%) = 100 \times A/B \tag{n}$$

where, B is a solid angle [steradian] extending from a center of rotation of the eyeball to the entire spectacle lens, and A is a solid angle [steradian] extending the clear visual region of the spectacle lens.

A concrete calculation method of the equation (n) is calculated by the following equation (O) equivalent to the equation (n). The number K of many (mathematically) random rays is generated from the center of rotation of the eyeball to a front hemisphere by the ray tracing method, and the number of rays which transmit the entire lens is considered as Bd, and the number thereof which transmit the clear visual region is considered as Ad. In this case, A and Ad, B and Bd respectively have proportional relations. Accordingly, a second clear visual region ratio is calculated by the following equation (O).

[Equation 5]

$$\text{second clear visual region ratio } P(\%) = 100 \times \lim_{K \to \infty} \frac{Ad}{Bd} \tag{O}$$

Furthermore, instead of the equation (O), the clear visual region ratio can be approximately calculated by also the following equation (p) as a third clear visual region ratio. The reason to use a term "approximately" is because the proportional relation between the number of rays and the solid angles is broken when a visual angle is large. However, since the solid angle is small within a range of a general lens diameter (a diameter of 80 [mm] or less), the equation (p) is usable with no problem.

When the rays enter from the center of rotation of the eyeball to the lens with the same intervals, the equation (p) is made up as a following third clear visual region ratio.

[Equation 6]

$$\text{third clear visual region ratio } P(\%) = 100 \times \lim_{K \to \infty} \frac{N}{Be} \tag{p}$$

where, $B_e$ is the number of rays which transmit the entire spectacle lens, and N is the number thereof which transmit the clear visual region.

According to an expression by percent in the clear visual region ratio using the aforementioned equations from (n) to (p), a size of the clear visual region is instinctively easy to understand. On the other hand, when the entire spectacle lens changes (for example, change of a lens diameter), the solid angle B changes even if the aforementioned clear visual region ratio P% has the equal solid angle A. Furthermore, an expression by the aforementioned solid angle A is a theoretically accurate expression, but it is instinctively hard to understand as an expression of the spectacle lens. Furthermore, the solid angle extending in the clear visual region is not symmetrical to the optical axis when the spectacle lens is not symmetrical to the optical axis. Therefore, this method has a room to consider when the optical performances having lenses of different diameters are compared.

[Calculating Optical Performance Value]

Therefore, in the present invention, an optical performance value which depends on a size of the clear visual region capable of calculating based on a spherical cone is more preferably calculated when the spherical cone which has an equal solid angle with a solid angle including the determined clear visual region from the center of rotation of the eye (center of rotation of the eyeball) and which is symmetrical to the optical axis of the spectacle lens is assumed. The calculation of the optical performance value includes a calculation of a clear visual angle and a calculation of a clear visual diameter, both of which are described later.

Incidentally in an embodiment of the invention, a range within 0.1 [logMR] by converted visual acuity is defined as the clear visual region.

(a) Calculating clear visual angle

First, the solid angle [steradian] is calculated as a spherical cone 6 symmetrical to an optical axis 4 of a spectacle lens 2 as shown in FIG. 1. The spherical cone 6 has a center of rotation of eyeball 12 as a vertex and has a spherical portion on a side of the spectacle lens 2.

If a vertex angle θ of the spherical cone 6 is calculated and expressed by a unit of degree as the clear visual angle, it is a form of expression easy to understand. The vertex angle θ of the spherical cone 6 is a vertex angle θ when the spherical cone 6 is cut in a flat surface including the optical axis 4. It should be noted that a term clear visual angle is coined by the inventors, and it can be replaced as, for example, an average visual angle or an equivalent visual angle.

Specifically, the clear visual angle can be calculated by the following equation (q) (first clear visual angle).

[Equation 7]

$$\text{first clear visual angle} = \lim_{K \to \infty} 2 \times \cos^{-1}\left(1 - \frac{Ad}{K}\right) \tag{q}$$

where, K is the number of rays when many rays (mathematically) randomly enter the front hemisphere of the spectacle lens, and Ad is the number of the rays which transmit the clear visual region among the rays.

Furthermore, the front hemisphere of the spectacle lens means a front solid angle (a value is $2 \times \pi$ steradian).

As a concrete calculation of the equation (q), a spherical cone of a unit sphere symmetrical to the optical axis 4 having a center of rotation of eyeball 12 as a vertex is thought. An angle made by the spherical cone is the clear visual angle. If the solid angle corresponding to the number Ad of rays is considered as an area of a spherical portion of the aforementioned spherical cone, the solid angle corresponding to the number K of rays, being $2 \times \pi$ has the following relationship.

[Equation 8]

$$Ad: K = 2 \times \pi \times \left[1 - \cos\left(\frac{\text{first clear visual angle}}{2}\right)\right] : 2 \times \pi$$

The equation (q) is made up by the above equation.

Furthermore, instead of the equation (q), the clear visual angle can be approximately calculated by also the following equation (r) as a second clear visual angle. The reason to use a term "approximately" is because the proportional relation between the number of rays and the solid angles is broken when the visual angle is large. However, since the solid angle to the spectacle lens having a lens diameter (specifically, for example, a diameter of 80 [mm] or less) used in a general spectacles industry is small, the following equation (r) can be used with no problem because the aforementioned proportional relation does not practically affect a lens.

[Equation 9]

$$\text{second clear visual angle} \cong 2 \times L \times \sqrt{\frac{N}{\pi}} \quad (r)$$

where, L is a degree interval when many rays enter from the center of rotation of eyeball 12 to the spectacle lens 2 with same degree intervals (for example, 1° pitch), and N is the number of rays which transmit the clear visual region among incident rays.

The value of the clear visual angle calculated as above is a value which depends on an absolute size of the clear visual region of the spectacle lens 2, not on the lens diameter. The value of the clear visual angle can be used as the optical performance value of the spectacle lens 2.

(b) Calculating clear visual diameter

In this step, a value of a clear visual diameter R corresponding to a diameter R of a circle obtained by projecting the solid angle of the spherical cone 6 on a flat surface 10 which is perpendicular to the optical axis 4 and which includes a rear vertex 8 of the spectacle lens 2 is calculated.

Specifically, the flat surface 10 in FIG. 1 which is perpendicular to the optical axis 4 and which includes the vertex (the rear vertex) 8 on a rear surface 2b of the lens 2 is considered as a rear flat surface. If the solid angle of a shape of the spherical cone 6 is projected on the rear flat surface 10, a circle appears on the rear flat surface 10. An outside diameter R of the circle is considered as a clear visual diameter (an equivalent diameter or an average diameter) of the clear visual region. The clear visual diameter R can be approximately calculated using the following equation (s) based on the clear visual angle (the equivalent visual angle) θ and a value of a distance VR between the rear vertex 8 and the center of rotation of eyeball 12. Incidentally, a term clear visual diameter is coined by the inventors.

[Equation 10]

$$\text{clear visual diameter} = 2 \times VR \times \tan\left(\frac{\text{clear visual angle}}{2}\right) \quad (s)$$

The clear visual angle θ or the clear visual diameter R of the clear visual region is easy to understand because even the spectacle lenses having different outside diameters and refractive indexes can be treated with a same sense.

It should be noted that a value calculated by the aforementioned equation (q) or equation (r) can be substituted with the clear visual angle θ in the equation (s).

Incidentally, in FIG. 1, a point where a ray generated at the angle of η/2 [degree] from the center of rotation of eyeball 12 to the optical axis 4 crosses a lens front surface 2a is considered as P1, and a value that a distance between the point P1 and the optical axis 4 is doubled is considered as K1. Also, in FIG. 1, when a line perpendicular to a connecting point of the outside diameter on the optical axis 4 of the spectacle lens 2 in a vertical direction is thought, a point where the perpendicular line crosses a ray of an extended line of the point P1 is considered as P2, and a value that a distance between the point P2 and the optical axis 4 is doubled is considered as K2. In this case, the smaller value of K1 or K2 can be defined as the clear visual diameter. However, in this case, a spectacle lens asymmetric to the optical axis 4 often has a case that the clear visual diameter changes according to every azimuth of the lens so as to become an axially asymmetric diameter, or that the clear visual diameter similarly changes due to design of a center thickness of the lens. Therefore, the clear visual diameter approximately calculated using the equation (s) is preferable.

The value of the clear visual diameter calculated as above depends on an absolute size of the clear visual region of the spectacle lens 2 and is not affected by the lens diameter. Therefore, the value of the clear visual diameter can be preferably used as the optical performance value of the spectacle lens 2.

Hitherto, a calculation method of the clear visual angle and the clear visual diameter which depend on the size of the clear visual region is explained. Incidentally, the clear visual angle and the clear visual diameter can be similarly calculated by measuring the clear visual region and using the measurement results thereof. The clear visual region can be directly measured to human eyes or mechanically measured by a measuring instrument. Specifically, the clear visual region is measured from the center of rotation of eyeball 12 with a same degree interval L [°] and the number of N which can be seen clearly is measured. Then, the clear visual diameter and the clear visual angle are calculated using the equations (s), (r).

Furthermore, the measuring instrument which directly measures the clear visual region by a steradian unit can calculate the clear visual angle by the following equation (t).

$$\text{clear visual angle} = 2 \times \cos^{-1}(1 - A/2\pi) \quad (t)$$

where, A is the clear visual region and A steradian. The clear visual diameter is measured by the equation (s).

Furthermore, 0.1 or below by the [logMAR] unit is considered as the clear visual region, and needless to say that, for example, 0.2 or below can be treated as the clear visual region and processed using the equations (n) or after.

[Displaying Optical Performance]

Next, the optical performances of the spectacle lens are displayed by using the calculated optical performance value. According to a preferred embodiment, the calculated value of the clear visual angle by the calculation of the clear visual angle is expressed by a unit of degree (for example, degree [°] or radian [rad]) as the optical performance value. Also, according to another preferred embodiment, the calculated value of the clear visual diameter by the calculation of the clear visual diameter is expressed by a unit of length (for example, [mm]) as the optical performance value.

The display described here includes all of the display of the optical performance value corresponding to plural lenses as a chart or a graph, displaying an image according to the optical performance value, and the like in addition to expressing the optical performance value described above.

BRIEF DESCRIPTION OF DRAWINGS

FIGS. 2A and 2B respectively correspond to astigmatic lenses having diameters of 80 [mm] and 70 [mm];

FIGS. 3A and 3B respectively correspond to astigmatic lenses having diameters of 80 [mm] and 60 [mm]

2 ... spectacle lens, 4 ... optical axis, 6 ... spherical cone, 8 ... rear vertex, 10 ... rear flat surface (flat surface), 12 ... center of rotation of eyeball (center of rotation of the eye), θ ... clear visual angle, R clear visual diameter, VR ... distance between rear vertex and center of rotation of eyeball.

BEST MODE FOR CARRYING OUT THE INVENTION

EXAMPLE 1

Optical performances of two astigmatic lenses respectively having diameters of 80 [mm] and 70 [mm] are calculated. Common lens data of both are listed in Table 1.

TABLE 1

| | |
|---|---|
| Spherical diopter (D) | −4 |
| Cylindrical diopter (D) | −2 |
| Refractive index | 1.60 |
| Center thickness (mm) | 1 |
| Front surface curvature (1/mm) | 0.00535610067114 |
| Rear surface curvature (sphere) (1/mm) | 0.01207824453097 |
| Rear surface curvature (astigmatism) (1/mm) | 0.01375609687996 |

Furthermore, the distances VR between the rear vertexes 8 and the centers of rotation of eyeball 12 of both the astigmatic lenses are 28.333 [mm].

Figure 1:
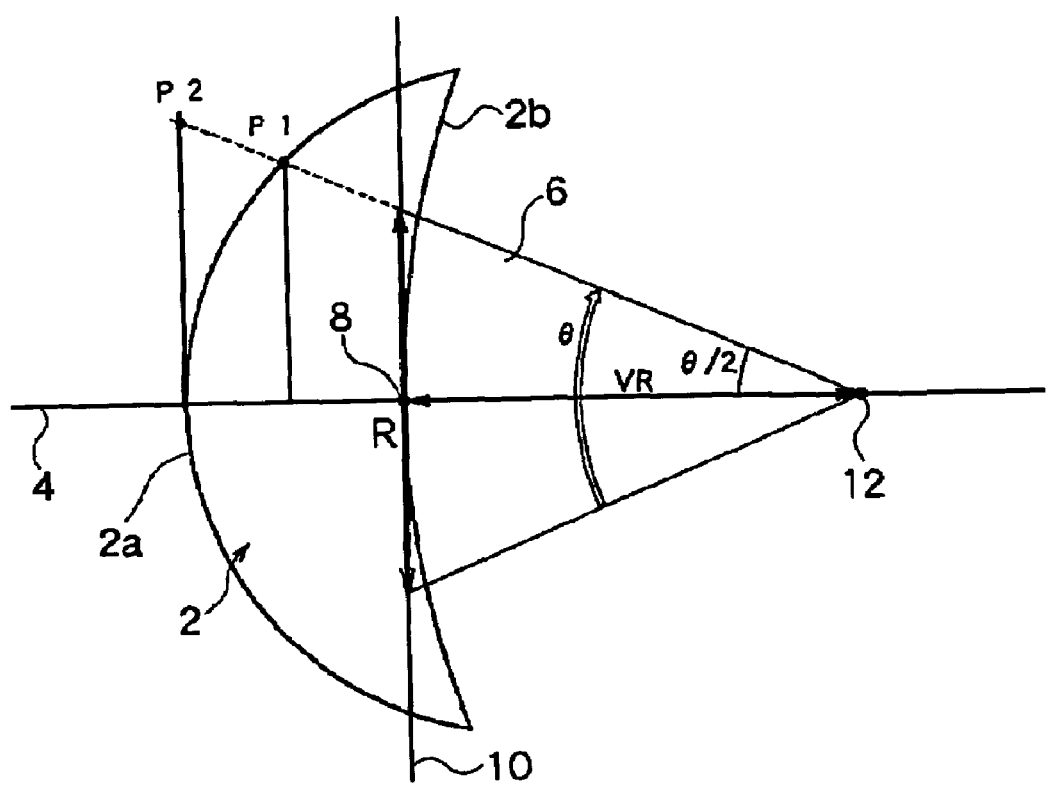
FIG. 1 is an explanatory view of a clear visual angle and a clear visual diameter.
Figure 2:
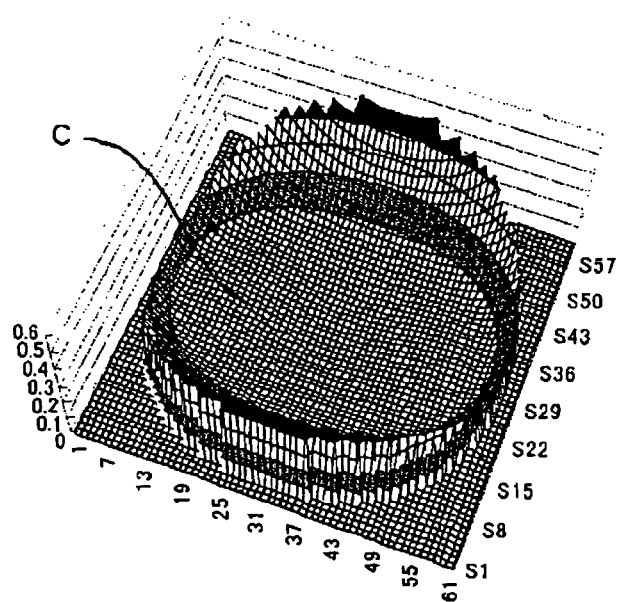
FIG. 2 is a view three-dimensionally showing values of an evaluation function on astigmatic lenses for explaining design conditions of the astigmatic lenses as display objects of optical performances in an example.
Figure 2:
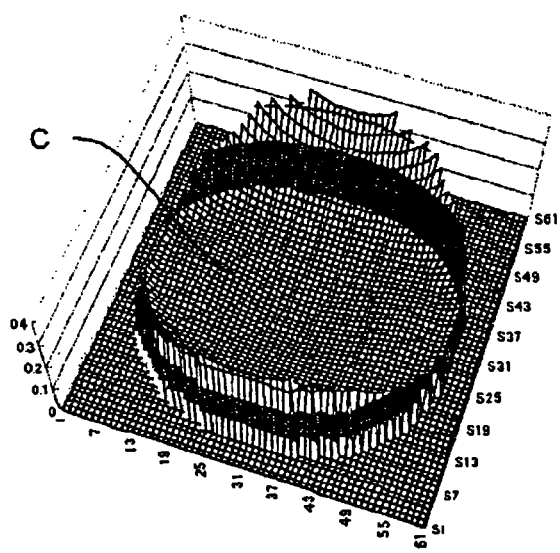

FIG. 2 is a view three-dimensionally displaying the optical performances of the lenses for explaining actual sizes or shapes of clear visual regions in the astigmatic lenses. In this drawing, visual angles are taken in horizontal axes, and scaled for every two [degree] pitch. Converted visual acuity values [logMAR] are taken in vertical axes. FIG. 2A shows the optical performance of the astigmatic lens having a diameter of 80 [mm], and FIG. 2B shows the optical performance of the astigmatic lens having a diameter of 70 [mm]. In FIGS. 2A and 2B, central portions shown in reference letters C are respectively regions having a converted visual acuity value of 0.1 [logMAR] or below, and clear visual regions where objects are clearly seen. Absolute sizes of clear visual regions C are identically set up in both lenses.

A method for displaying the optical performances of the present invention is applied to the astigmatic lenses described above.

First, rays enter from centers of rotation of the eyeballs to the respective astigmatic lenses with same intervals, and the number of rays $B_e$ which transmit the entire astigmatic lenses and the number N which transmit the clear visual regions are measured. Measurement results are listed in the following Table 2.

Subsequently, clear visual angles are calculated using the aforementioned equation (r), and simultaneously clear visual diameters are calculated by substituting the calculated results with the aforementioned equation (q).

Furthermore, for comparison, clear visual region ratios P% are calculated using the aforementioned equation (n) as a method previously devised by the inventors. Respective calculation results are listed in Table 2.

TABLE 2

| | $B_e$ | N | P % | Clear visual angle | Clear visual diameter |
|---|---|---|---|---|---|
| Diameter 80 | 2493 | 1567 | 63% | 89 degrees | 56 mm |
| Diameter 70 | 2165 | 1567 | 72% | 89 degrees | 56 mm |

As shown in Table 2, values of the clear visual angles and values of the clear visual diameters are respectively expressed as concrete numerical values. Therefore, when they are compared on seeing longitudinal aberration graphs or the like, the optical performances of a single spectacle lens are quantitatively and easily evaluated. Furthermore, the values of the clear visual angles are expressed by a unit of degree [°], and the values of the clear visual diameters are expressed by a unit of [mm]; therefore, even those who do not have technical knowledge can instinctively and easily understand a meaning of these numerical values. Furthermore, the optical performances of an axially asymmetric lens such as an astigmatic lens can be quantitatively evaluated as an entire lens.

Incidentally, an expression by the clear visual region ratio P% is easy to understand; however, the clear visual region ratio P% changes when a lens diameter changes as shown in Table 2. In other words, when the clear visual regions are identical, a value of the clear visual region ratio P% increases because a ratio of the clear visual region becomes relatively larger as the lens diameter becomes small. Accordingly, spectacle lenses having different diameters are hard to evaluate from a view of an absolute size of the clear visual region.

In contrast to the above, the values of the clear visual angles and the clear visual diameters according to the aforementioned display method are identical in both lenses. This shows that the sizes of the clear visual regions respectively having different diameters can be justly evaluated. In other words, according to the display method of the present invention, a comparison of the optical performances of the lenses having different design conditions such as the diameter or the like can be appropriately and easily conducted.

EXAMPLE 2

Figure 3:
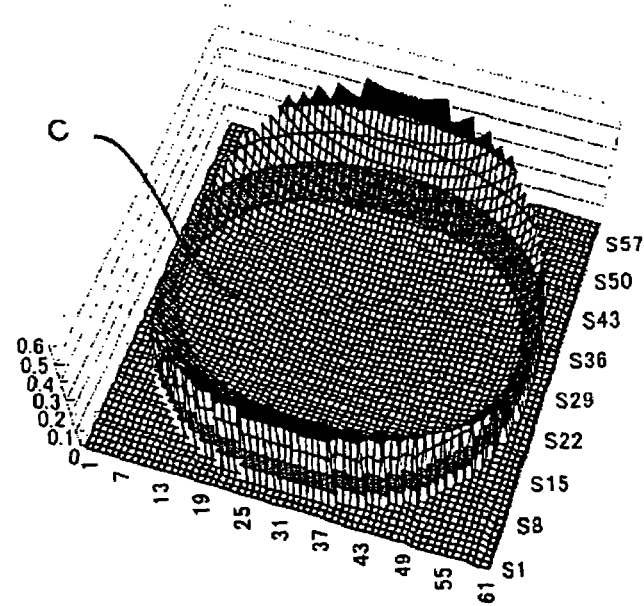
FIG. 3 is a view three-dimensionally showing values of an evaluation function on astigmatic lenses for explaining design conditions of the astigmatic lenses as display objects of optical performances in another example.
Figure 3:
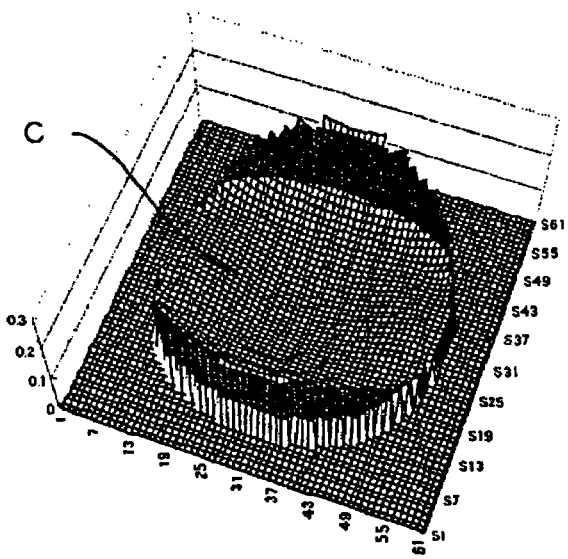
Figure 4:
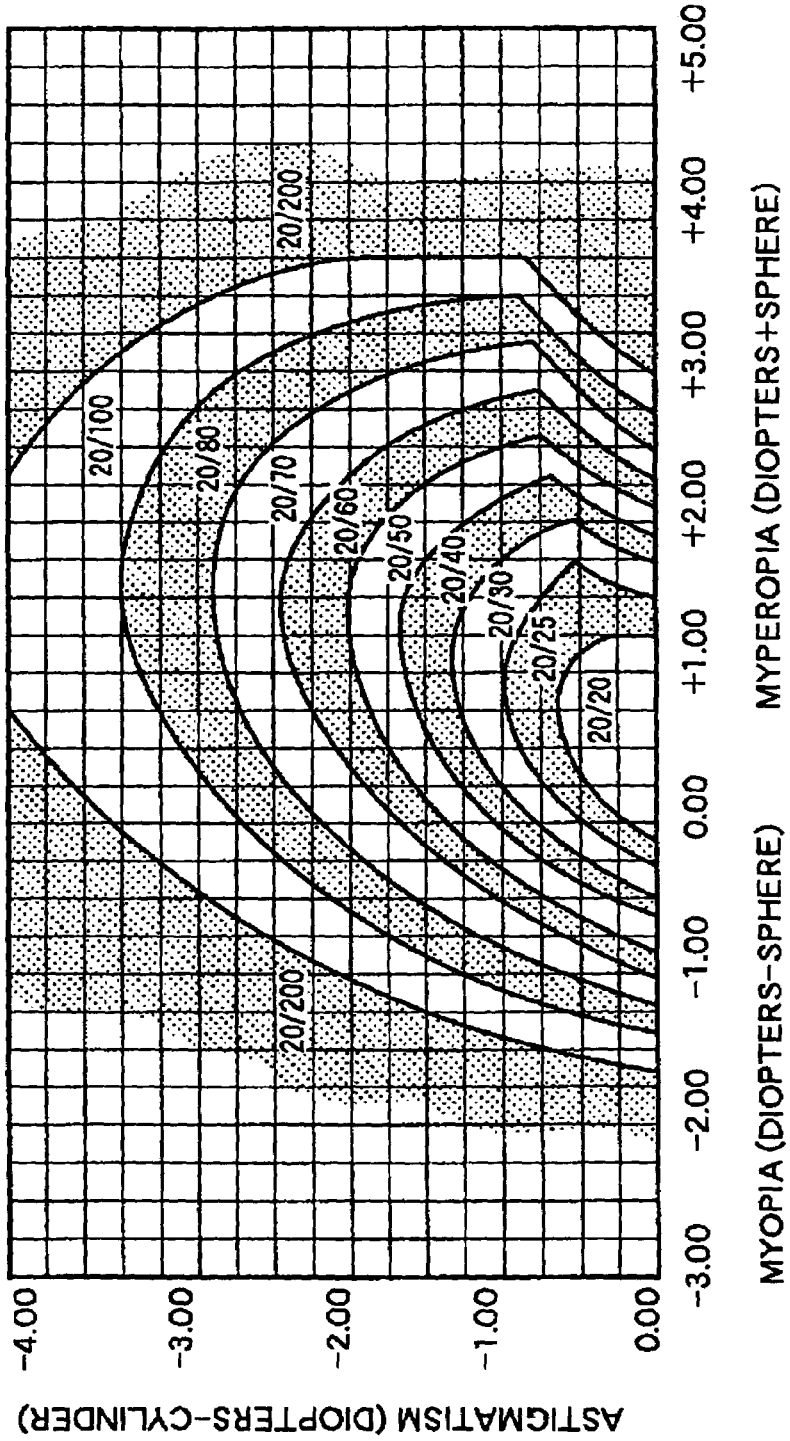
FIG. 4 is a view showing measurement results of visual acuity shown in references.

Optical performances of two astigmatic lenses respectively having diameters of 80 [mm] and 60 [mm] are calculated. Common lens data or the like of both are the same as Example 1. FIG. 3 is a view three-dimensionally displaying the optical performances of the lenses for explaining clear visual regions in the astigmatic lenses as well as FIG. 2. FIG. 3A shows the optical performances of the astigmatic lens having a diameter of 80 [mm], and FIG. 3B shows the optical performances of the astigmatic lens having a diameter of 60 [mm]. In FIGS. 3A and 3B, central portions shown in reference letters C are respectively regions having a converted visual acuity value of 0.1 [logMAR] or below, and clear visual regions where objects are clearly seen. Absolute sizes of clear visual regions C are identically set up in both lenses.

A method for displaying the optical performances of the present invention is applied to the astigmatic lenses described above.

First, rays enter from centers of rotation of the eyeballs to the respective astigmatic lenses with same intervals, and the number of rays $B_e$ which transmit the whole astigmatic lenses and the number N which transmit the clear visual regions are measured. Measurement results are listed in the following Table 3.

Subsequently, clear visual angles are calculated using the aforementioned equation (r), and simultaneously clear visual diameters are calculated by substituting the calculated results with the aforementioned equation (s).

Furthermore, for comparison, clear visual region ratios P% are calculated using the aforementioned equation (n) as a method previously devised by the inventors. Respective calculation results are listed in Table 3.

TABLE 3

|  | $B_e$ | N | P % | Clear visual angle | Clear visual diameter |
|---|---|---|---|---|---|
| Diameter 80 | 2493 | 1567 | 63% | 89 degrees | 56 mm |
| Diameter 60 | 1801 | 1499 | 83% | 87 degrees | 54 mm |

The clear visual region ratio P% changes when a lens diameter changes as shown in Table 3. A difference in both diameters is 20 [mm], and the clear visual region ratio P% changes larger than that in Example 1.

In contrast to the above, the values of the clear visual angles and the clear visual diameters according to the present invention are almost similar in both lenses.

It should be noted that a reason why the clear visual angles and the clear visual diameters slightly change according to the respective lens diameters is thought that the clear visual angles and the clear visual diameters are respectively underestimated because a part of an outside diameter in a circumferential edge of the astigmatic lens having a diameter of 60 [mm] is not included in the lens diameter as the clear visual region on calculating a solid angle.

However, to a phenomenon that the clear visual region ratio P% largely changes when a diameter changes, as described above, a ratio of change of the clear visual angle and the clear visual diameter is so little that the lenses can be used with no practical problem.

INDUSTRIAL APPLICABILITY

According to the present invention, a method for displaying optical performances preferably applicable to also an axially asymmetric spectacle lens is provided. Furthermore, according to the present invention, a comparison of the optical performances of the lenses having different design conditions such as a diameter or the like is appropriately and easily conducted. Furthermore, according to the present invention, the optical performances as the entire lens can be quantitatively evaluated. Furthermore, according to the present invention, the optical performances of the spectacle lens can be displayed instinctively and easily to understand.

The invention claimed is:

1. A method for displaying the optical performance of a spectacle lens, comprising:
    determining a clear visual region of the spectacle lens;
    calculating a solid angle from the clear visual region and a center of rotation of an eye;
    assuming a spherical cone which has an equal solid angle with the solid angle thus calculated and is symmetrical to an optical axis of said spectacle lens;
    calculating an optical performance value which depends on a size of the clear visual region, based on the step of assuming the spherical cone; and
    displaying the optical performance of the spectacle lens using the calculated optical performance value.

2. The method for displaying the optical performance of the spectacle lens according to claim 1, wherein
    said calculation of the optical performance value includes calculating a value of a clear visual angle corresponding to a vertex angle of the spherical cone.

3. The method for displaying the optical performance of the spectacle lens according to claim 2, wherein
    the clear visual angle is calculated using the following equation (1) on the calculation of the clear visual angle:

[Equation 1]

$$\text{first clear visual angle} = \lim_{K \to \infty} 2 \times \cos^{-1}\left(1 - \frac{Ad}{K}\right) \quad (1)$$

where, K is the number of incident rays when many rays are randomly made incident to a front hemisphere of the spectacle lens, and Ad is the number of transmitted rays which transmit the clear visual region out of the incident rays.

4. The method for displaying the optical performance of the spectacle lens according to claim 2, wherein
    the clear visual angle is approximately calculated by using the following equation (2) on the calculation of the clear visual angle:

[Equation 2]

$$\text{second clear visual angle} \cong 2 \times L \times \sqrt{\frac{N}{\pi}} \quad (2)$$

where, L is a degree interval when many rays enter from the center of rotation of the eye to the spectacle lens with a same degree interval, and N is the number of the rays which transmit the clear visual region among incident rays.

5. The method for displaying the optical performance of the spectacle lens according to claim 2, wherein
    the calculated value of the clear visual angle by the calculation of the clear visual angle is expressed by a unit of degree as the optical performance value on said display of the optical performance of the spectacle lens.

6. The method for displaying the optical performance of the spectacle lens according to claim 1, wherein the spherical cone has a center of rotation of the eye as a vertex and has a spherical portion on a side of the spectacle lens; and said calculation of the optical performance value includes calculating a value of a clear visual diameter corresponding to a diameter of a circle, the circle representing a part where the surface obtained by extending the side surface of the spherical cone and a flat surface which is perpendicular to the optical axis and which includes a rear vertex of the spectacle lens cross.

7. The method for displaying the optical performance of the spectacle lens according to claim 2, wherein said calculation of the optical performance value further includes calculating a clear visual diameter by substituting the calculated value of the clear visual angle on the calculation of the clear visual angle with the following equation (3).

[Equation 3]

$$\text{clear visual diameter} = 2 \times VR \times \tan\left(\frac{\text{clear visual angle}}{2}\right) \quad (3)$$

where, VR is a distance between the rear vertex of the spectacle lens and the center of rotation of the eye.

8. The method for displaying the optical performance of the spectacle lens according to claim 6, wherein the calculated value of the clear visual diameter by the calculation of the clear visual diameter is expressed by a unit of length as the optical performance value on said display of the optical performance of the spectacle lens.

9. The method for displaying the optical performance of the spectacle lens according to claim 1, wherein the clear visual region of the spectacle lens is determined using an evaluation function about visual acuity of the spectacle lens on said determination of the clear visual region.

10. The method for displaying the optical performance of the spectacle lens according to claim 9, wherein converted visual acuity is used as the evaluation function about visual acuity.

11. The method for displaying the optical performance of the spectacle lens according to claim 3, wherein the calculated value of the clear visual angle by the calculation of the clear visual angle is expressed by a unit of degree as the optical performance value on said display of the optical performance of the spectacle lens.

12. The method for displaying the optical performance of the spectacle lens according to claim 4, wherein the calculated value of the clear visual angle by the calculation of the clear visual angle is expressed by a unit of degree as the optical performance value on said display of the optical performance of the spectacle lens.

13. The method for displaying the optical performance of the spectacle lens according to claim 3, wherein said calculation of the optical performance value further includes calculating a clear visual diameter by substituting the calculated value of the clear visual angle on the calculation of the clear visual angle with the following equation (3).

[Equation 3]

$$\text{clear visual diameter} = 2 \times VR \times \tan\left(\frac{\text{clear visual angle}}{2}\right) \quad (3)$$

where, VR is a distance between the rear vertex of the spectacle lens and the center of rotation of the eye.

14. The method for displaying the optical performance of the spectacle lens according to claim 4, wherein said calculation of the optical performance value further includes calculating a clear visual diameter by substituting the calculated value of the clear visual angle on the calculation of the clear visual angle with the following equation (3).

[Equation 3]

$$\text{clear visual diameter} = 2 \times VR \times \tan\left(\frac{\text{clear visual angle}}{2}\right) \quad (3)$$

where, VR is a distance between the rear vertex of the spectacle lens and the center of rotation of the eye.

15. The method for displaying the optical performance of the spectacle lens according to claim 7, wherein the calculated value of the clear visual diameter by the calculation of the clear visual diameter is expressed by a unit of length as the optical performance value on said display of the optical performance of the spectacle lens.

16. The method for displaying the optical performance of the spectacle lens according to claim 13, wherein the calculated value of the clear visual diameter by the calculation of the clear visual diameter is expressed by a unit of length as the optical performance value on said display of the optical performance of the spectacle lens.

17. The method for displaying the optical performance of the spectacle lens according to claim 14, wherein the calculated value of the clear visual diameter by the calculation of the clear visual diameter is expressed by a unit of length as the optical performance value on said display of the optical performance of the spectacle lens.

18. The method for displaying the optical performance of the spectacle lens according to claim 2, wherein the clear visual region of the spectacle lens is determined using an evaluation function about visual acuity of the spectacle lens on said determination of the clear visual region.

19. The method for displaying the optical performance of the spectacle lens according to claim 3, wherein the clear visual region of the spectacle lens is determined using an evaluation function about visual acuity of the spectacle lens on said determination of the clear visual region.

20. The method for displaying the optical performance of the spectacle lens according to claim 4, wherein the clear visual region of the spectacle lens is determined using an evaluation function about visual acuity of the spectacle lens on said determination of the clear visual region.

21. The method for displaying the optical performance of the spectacle lens according to claim 5, wherein the clear visual region of the spectacle lens is determined using an evaluation function about visual acuity of the spectacle lens on said determination of the clear visual region.

22. The method for displaying the optical performance of the spectacle lens according to claim 6, wherein
the clear visual region of the spectacle lens is determined using an evaluation function about visual acuity of the spectacle lens on said determination of the clear visual region.

23. The method for displaying the optical performance of the spectacle lens according to claim 7, wherein
the clear visual region of the spectacle lens is determined using an evaluation function about visual acuity of the spectacle lens on said determination of the clear visual region.

24. The method for displaying the optical performance of the spectacle lens according to claim 11, wherein
the clear visual region of the spectacle lens is determined using an evaluation function about visual acuity of the spectacle lens on said determination of the clear visual region.

25. The method for displaying the optical performance of the spectacle lens according to claim 12, wherein
the clear visual region of the spectacle lens is determined using an evaluation function about visual acuity of the spectacle lens on said determination of the clear visual region.

26. The method for displaying the optical performance of the spectacle lens according to claim 13, wherein
the clear visual region of the spectacle lens is determined using an evaluation function about visual acuity of the spectacle lens on said determination of the clear visual region.

27. The method for displaying the optical performance of the spectacle lens according to claim 14, wherein
the clear visual region of the spectacle lens is determined using an evaluation function about visual acuity of the spectacle lens on said determination of the clear visual region.

28. The method for displaying the optical performance of the spectacle lens according to claim 18, wherein
converted visual acuity is used as the evaluation function about visual acuity.

29. The method for displaying the optical performance of the spectacle lens according to claim 19, wherein
converted visual acuity is used as the evaluation function about visual acuity.

30. The method for displaying the optical performance of the spectacle lens according to claim 20, wherein
converted visual acuity is used as the evaluation function about visual acuity.

31. The method for displaying the optical performance of the spectacle lens according to claim 21, wherein
converted visual acuity is used as the evaluation function about visual acuity.

32. The method for displaying the optical performance of the spectacle lens according to claim 22, wherein
converted visual acuity is used as the evaluation function about visual acuity.

33. The method for displaying the optical performance of the spectacle lens according to claim 23, wherein
converted visual acuity is used as the evaluation function about visual acuity.

34. The method for displaying the optical performance of the spectacle lens according to claim 24, wherein
converted visual acuity is used as the evaluation function about visual acuity.

35. The method for displaying the optical performance of the spectacle lens according to claim 25, wherein
converted visual acuity is used as the evaluation function about visual acuity.

36. The method for displaying the optical performance of the spectacle lens according to claim 26, wherein
converted visual acuity is used as the evaluation function about visual acuity.

37. The method for displaying the optical performance of the spectacle lens according to claim 27, wherein
converted visual acuity is used as the evaluation function about visual acuity.

* * * * *